United States Patent [19]
Morellini

[11] Patent Number: 4,574,567
[45] Date of Patent: Mar. 11, 1986

[54] HARVESTERS

[76] Inventor: Peter Morellini, P.O. Box 88, Ingham, Queensland 4850, Australia

[21] Appl. No.: 562,585
[22] PCT Filed: Apr. 8, 1983
[86] PCT No.: PCT/AU83/00041
§ 371 Date: Dec. 7, 1983
§ 102(e) Date: Dec. 7, 1983
[87] PCT Pub. No.: WO83/03519
PCT Pub. Date: Oct. 27, 1983

[30] Foreign Application Priority Data
Apr. 8, 1982 [AU] Australia .............. PF3548

[51] Int. Cl.$^4$ .............. A01D 45/10; B65G 53/44; B65G 53/48
[52] U.S. Cl. .............. 56/16.5; 56/12.8; 56/13.9
[58] Field of Search .............. 56/13.9, 14.3, 14.5, 56/16.5, 12.8

[56] References Cited
U.S. PATENT DOCUMENTS
1,990,250 2/1935 Pitcher .............. 209/153
3,863,431 2/1975 Fowler .............. 56/502

FOREIGN PATENT DOCUMENTS
391626 of 1926 Australia .
2059867 9/1972 Australia .
6448574 7/1975 Australia .
490266 8/1930 Denmark .
394288 6/1933 United Kingdom .

Primary Examiner—Robert Peshock
Assistant Examiner—David I. Tarnoff
Attorney, Agent, or Firm—Wood, Dalton, Phillips, Mason & Rowe

[57] ABSTRACT

A cane harvester (10) having an endless conveyor (15) for elevating cane billets from a chopper (14) for deposit through a passage (44) onto a secondary elevator (16). A fan (17) directs a blast of air across the pasage (44) to force trash and leaves through an outlet chute (18). A rake assembly (25) is provided above the conveyor (15) to level and even the billets and trash thereon and an air jet arrangement (47, 48, 57, 58) is disposed at the upper end of the conveyor (15) to prevent build up of trash and assist the conveyance of trash and billets through the passage (44). A trash deflecting assembly (74) is provided in the outlet chute (18) so that the direction of trash exiting therefrom can be selectively varied.

7 Claims, 10 Drawing Figures

HARVESTERS

This invention relates to improvements to harvesters in particular sugar cane harvesters.

Conventional cane harvesters normally include a forwardly extending topper mechanism with is adapted to cut the tops from cane prior to the cane being gathered by the harvester. Cane harvesters also include a base cutter assembly for cutting the cane at its base and a chopper mechanism which cuts the harvested cane into billets and directs the cane billets onto a primary elevator for transport to a secondary elevator so that the cane billets can be deposited in a collection bin or the like. Many machines also incorporate blowers so that trash collected by the harvesters can be blown through a discharge chute at the rear of the machine.

The above known machines suffer a number of disadvantages. Firstly in some harvesters the topper mechanism tends to direct the cut cane tops into the path of the harvester particularly where cross-winds are blowing. This consequently results in the harvester collecting extraneous material and loss of commercial cane sugar. To overcome this disadvantage, some topper mechanisms employ rotating vanes mounted above the topper cutting disc which pelt the cut tops of the cane outwardly to either side of the harvester. Whilst this arrangement usually ensures that the cane tops are not collected by the harvester, a danger is obviously created to people working in the area such as bin halt-out drivers.

A further disadvantage in the known harvesters occur when sugar cane that has fallen over as a result of wind or heavy rain, or standover can is to be harvested. In such instances, there is an uneven feed of cane to the chopping mechanism resulting in an uneven deposit of cane on the primary elevator. As a consequence an uneven flow of the chopped-up material has to be handled by the blower which can cause blockages in the trash discharge system. Furthermore, the deposit of billets into the secondary elevator in such circumstances tends to be uneven and often the trash is not clearly stripped from the billets.

Yet a further disadvantage of the known harvesters occurs when the primary elevator is depositing cane billets onto the secondary elevator for transport to a bin collection area. Difficulties often occur at the top or return point of the primary elevator in that in adverse conditions, for example when the cane is wet or where down cane is being harvested, trash tends to collect at that point. Similarly, if the knives of the harvester become blunt the chopped-up material does not flow clearly past the end of the primary elevator. As a result of the above, blockages can occur and the flights on the primary elevator, during their return, take some or all of the chopped-up material including billets back onto the ground resulting in waste. Furthermore, build-up of trash can occur around the top or return point which can cause a reduction in the cross-sectional area of the passage through which billets are deposited from the primary elevator onto the secondary elevator. This disadvantage is also encountered in other harvesters such as wheat harvesters where the harvested product is carried along by an elevator for deposit at the return point of the elevator.

Yet a further disadvantage of the known harvesters occurs particularly where green sugar cane is being cut. In such instances, large quantities of waste material or trash is collected and if there are strong winds blowing, most of the trash is exhausted by the harvester into the next row of cane which is to be cut. The harvester then collects double the amount of trash on its return run and in order to obtain a clean sample of cane billets, the harvester has to be driven slower thus reducing the capacity of the machine and reducing harvester efficiency. Furthermore, the extra trash can cause blockages within the harvester.

The present invention aims to overcome or alleviate at least some of the above disadvantages of the prior art harvesters. In particular, the present invention provides an arrangement to reduce blockages at the top or return point of the primary elevator and to assist passage of chopped material from the primary elevator to the secondary elevator. The invention also provides an improved topper construction and a levelling and stripper assembly for use in conjunction with the harvester primary or secondary elevator to level out the cane billets thereon and strip trash, leaves and the like from the billets. The invention also provides an improved means for disposal of trash collected by the harvester. Other objects and advantages of the invention will become apparent from the following description.

With the foregoing and other objects in view this invention resides broadly in a conveyor assembly of the type including conveyor means for conveying a product along a first path for deposit at the end or return point of the conveyor means into downwardly directed passage means, and characterised by the provision of forced air means having an outlet means at or adjacent said end or return point of said conveyor means whereby forced air from said outlet means assists conveyance of said product along said passage means and whereby product build-up at said return point is reduced or eliminated. Preferably the conveyor means comprises an endless elevator in a cane harvester for elevating cane billets and trash from a chopping station for deposit in a passage leading to a billet discharge elevator.

In order that the invention may be more readily understood and put into practical effect, reference will now be made to the accompanying drawings which illustrate preferred embodiments of the invention and wherein.

Figure 1:
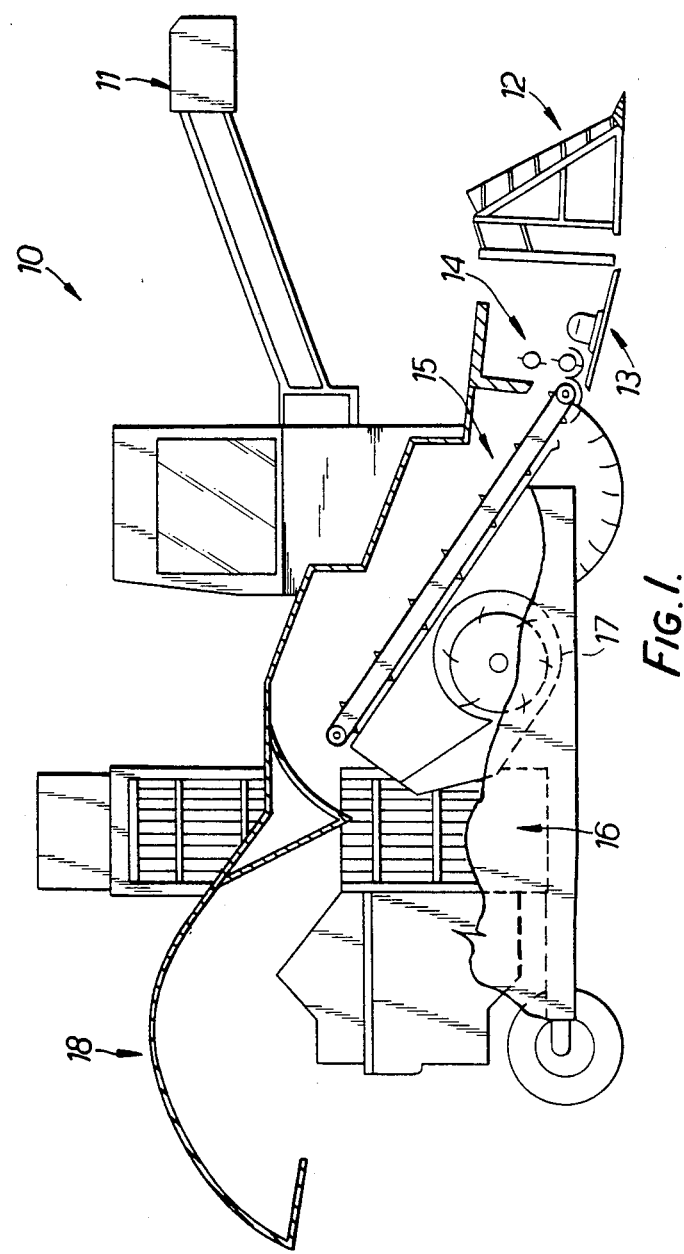
FIG. 1 is a partly cut-away view showing a typical known cane harvester suitable for incorporating the improvements of the present invention.

Referring now to FIG. 1 there is illustrated a typical conventional cane harvester 10 including a forwardly extending topper mechanism 11 for cutting the tops of cane stalks prior to their being fed to the harvesting machine and forward rotary dividers 12 for directing the cane into the base cutters 13 which cut the cane stalks at their base. Co-operative rotary chopper drums 14 are arranged rearwardly of the base cutters 13 and are adapted to chop the cane stalks into billets and deposit the billets onto a primary elevator 15 for raising the billets to a position whereby they may be deposited onto a secondary elevator 16, the secondary elevator 16 being adapted to raise the billets to an elevated height for depositing in a collection bin or the like.

A blower fan 17 is arranged between the primary elevator 15 and the secondary elevator 16 is adapted to blow through the cane billets as they fall from the primary elevator 15 and to direct leaves and trash rearwardly of the harvester through a chute 18.

Figure 2:
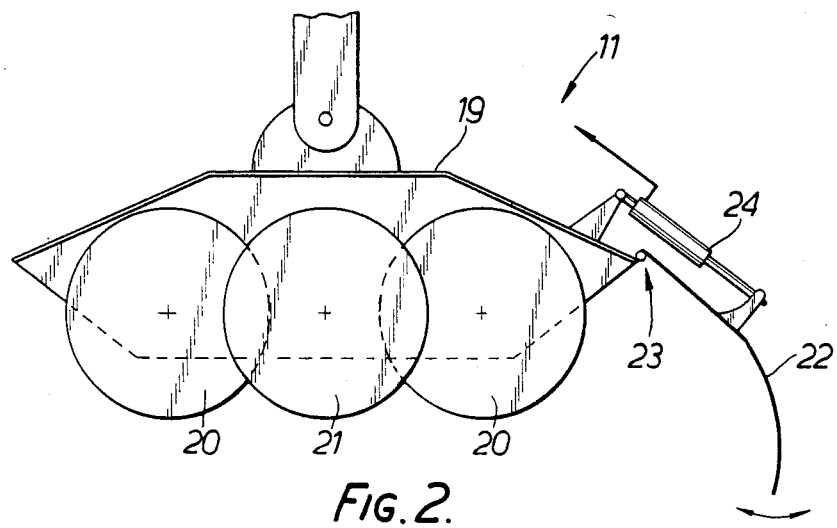
FIGS. 2 and 3 are respective plane and elevational views of the improved topper mechanism according to the present invention.
Figure 3:
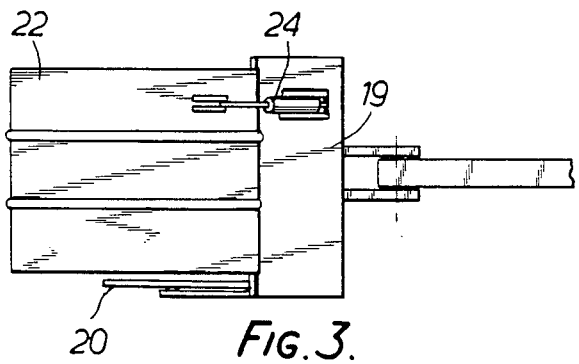

As shown in FIGS. 2 and 3, the topper 11 includes an outer housing 19 in which are mounted a pair of gathering and throwing rotors 20 and a cutting disc 21. The gathering and throwing rotors 20 are adapted to direct the tops of the cane stalks towards the cutting disc 21 which cuts the tops from the stalks and the rotors 20 are then adapted to throw the cut tops outwardly. In accordance with the present invention a hinged deflector door 22 is pivotally connected at 23 to one or both sides of the topper housing 19 for rotation about a substantially vertical axis. Preferably pivotal movement of the hinged door 22 is controlled by a hydraulic ram 24 mounted between the housing 19 and door 22 which is hydraulically linked to a control valve located within the cabin of the harvester.

In use, and when heavy cross winds are encountered, the door 22 can be opened by the operator by actuation of the hydraulic ram 24 so that cane tops which have been cut and thrown outwardly by the rotors 20 strike the door 22 which absorbs much of the energy of the tops so that they drop vertically to the ground away from the mouth of the harvester. This will ensure that the deflected tops do not enter the harvester and thus permit a larger commercial cane sugar yield to be achieved. Furthermore, where a paddock of cane is to be opened up or cane cut near a farm headland, the door 22 can be moved inwardly so that the tops can be directed as close as possible to the harvester. Thus, in the return of the harvester down the next row no tops will be gathered and sent through the harvester. Of course, it will be seen that the angular position of the door 22 can be adjusted so that the tops can be directed where required.

Figure 4:
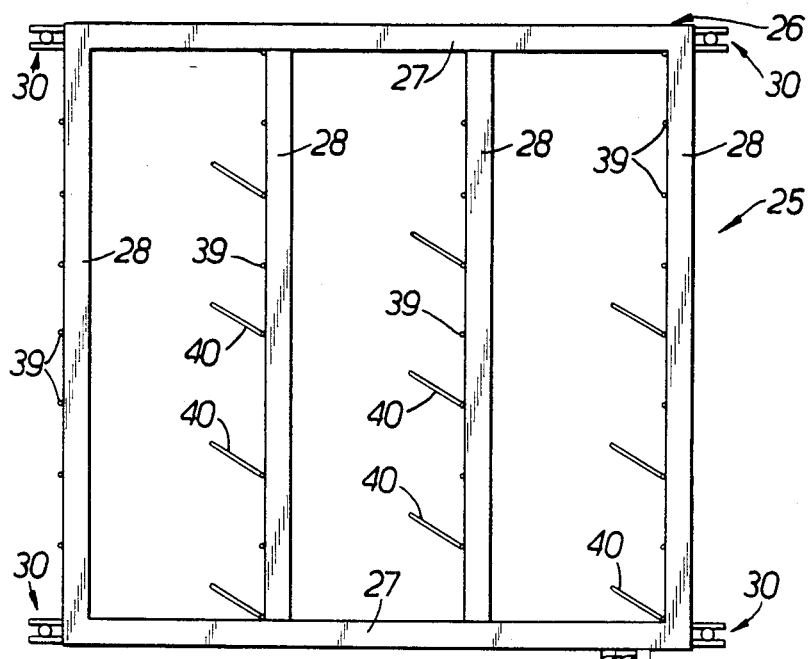
FIGS. 4, 5 and 6 are respective plan, elevational and perspective views of a levelling and stripper rake assembly for use in conjunction with the primary or secondary elevator to even cane and trash distribution thereon.
Figure 5:
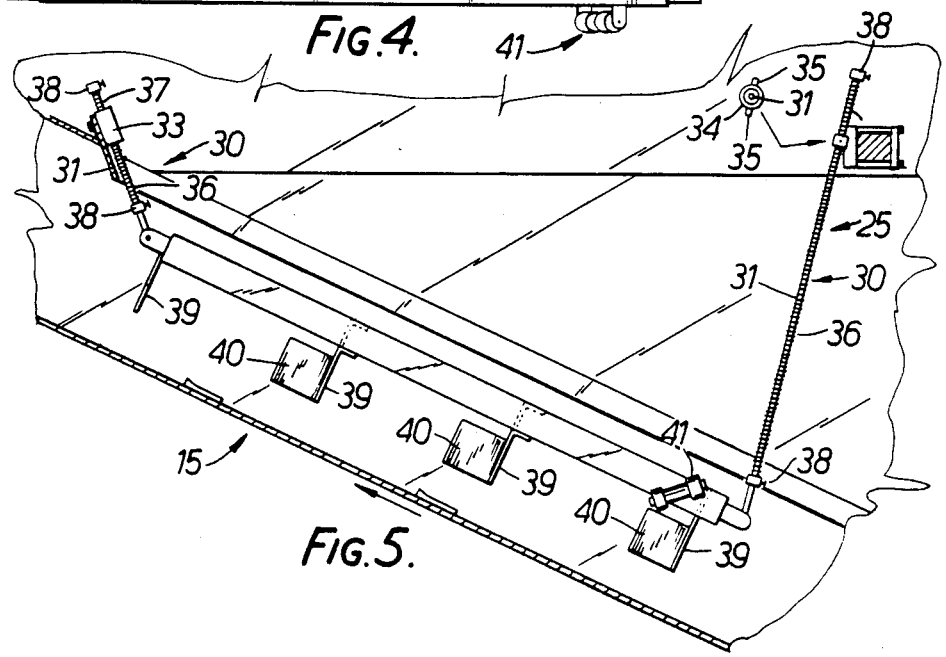
Figure 6:
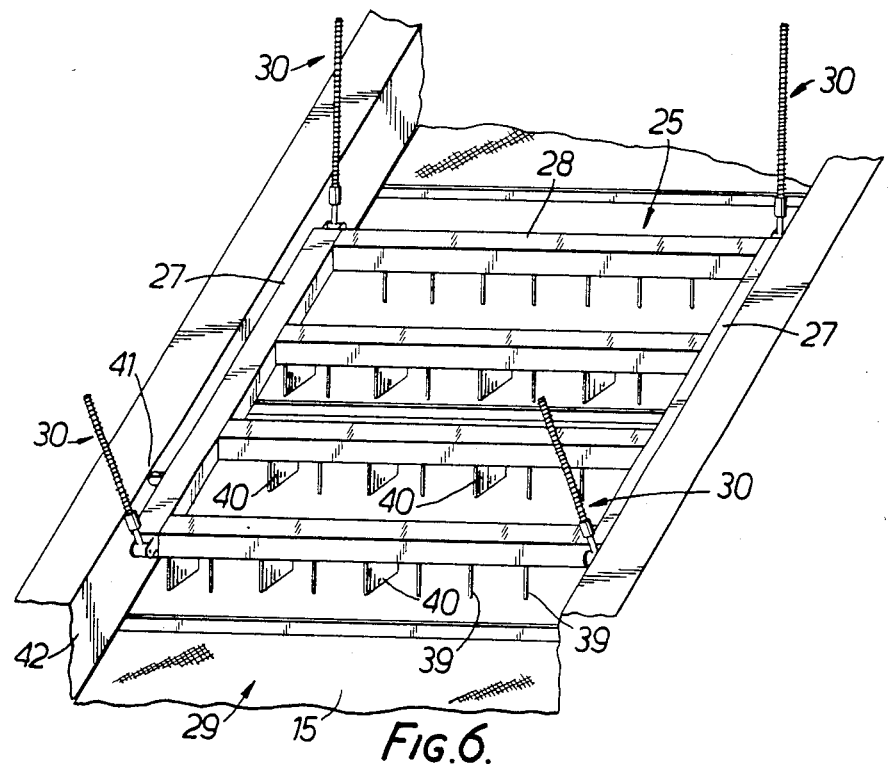

Referring now to FIGS. 4, 5 and 6, there is illustrated a levelling and stripper rake assembly 25 for use in conjunction with the primary or secondary elevator 15 or 16 of the harvester. As stated above, in many cases there is an uneven feed of cane along the primary elevator 15 from the chopper drum 14 resulting in an uneven deposit of cane billets onto the secondary elevator 15. In accordance with the present invention, the rake assembly 25 is adapted to be used in conjunction with either elevation to level uneven deposits of cane and strip trash, leaves, etc. therefrom. The rake assembly 25 includes a main rectangular frame assembly 26 having a pair of longitudinally extending side members 27 and a plurality of transverse parallel members 28 extending therebetween. The frame assembly 26 is adapted to be supported in the elevator trough 29 at each corner from the harvester frame by respective spring loaded hanger assemblies 30, each of which includes an elongated rod 31 pivotally supported to the frame assembly 26 at one end and passing at its other end through an apertured support assembly 33 mounted to the harvester frame.

Preferably the support assembly 33 includes an apertured eye member 34 having radially extending lugs 35 thereon which support the eye member in trunnion-like fashion for rotational movement about a horizontal axis whereby pivotal movement of the rods caused by movement of the frame assembly 26 can be accommodated without lock up. Respective springs 36 and 37 are disposed about each rod 31 and on either side of the support assembly and loading is adapted to be applied to the respective springs by clamp members 38 which are adjustable along the length of the rod. Preferably also pins, such as cotter pins, are provided to extend through the rods 31 above the support assemblies 33 so that in the event of spring failure, the rake assembly 25 will not drop onto the underlying elevator 15. Each transverse member 28 is provided with a plurality of downwardly extending prongs or fingers 39 which co-act with the cane billets and trash deposited on the elevator to level the same and which are operative to clean the cane by stripping trash therefrom. Preferably some of the prongs are provided with rearwardly extending vanes 40 which are inclined to the direction of travel of the elevator and act to spread the billets and trash across the elevator evenly.

Furthermore, there is preferably provided an inclined roller 41 on one side member which is adapted to co-operate with a side wall 42 of the elevator trough 29 (see FIG. 6). Deflection of the frame assembly 26 will tend to be in the upwards and rearwards direction and the roller 41 during this motion will roll along the side wall 42 of the elevator trough to allow for smooth movement of the frame assembly 26 and to maintain the frame assembly 26 in spaced relationship therefrom.

When the spring tension in the lower springs is increased a greater loading will be applied to the frame assembly 26 so that a greater force is maintained on the cane and trash on the elevator. The upper springs 37 are adapted to dampen shock loadings caused by rise and fall of the frame assembly 26 and of course the tension in these springs may be varied to vary the dampening effect on the frame assembly.

Figure 8:
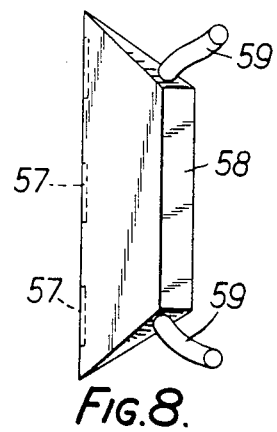
FIG. 8 is a view in the direction A of FIG. 7 showing the air manifold on one side of the billet and trash passage.
Figure 7:
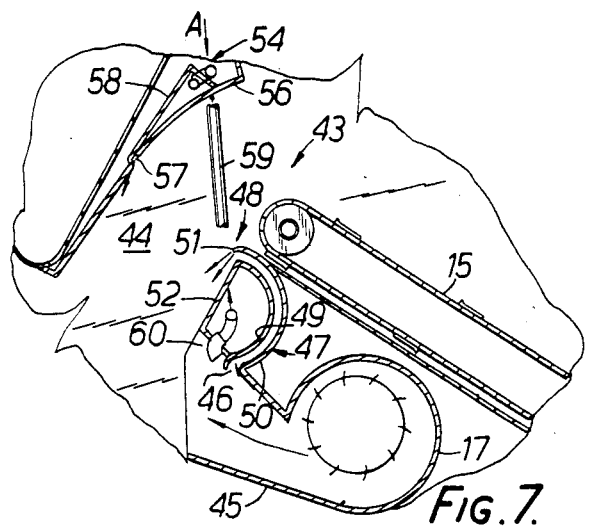
FIG. 7 is a partly sectional side view of the cane billet and trash flow assistors and blockage prevention arrangement at the upper or return point of the primary elevator.

Referring now to FIGS. 7 and 8 there is illustrated a system 43 for reducing or eliminating blockages at the end or return point of the primary elevator 15, and to assist the passage of cane billets and trash past the blower fan 17. As shown, the main blower fan 17 is located beneath the upper end of the elevator 17 and is adapted to blow air across the passage 44 through which cane and trash fall towards the secondary elevator so that the trash and scrap is separated from the billets. In accordance with the invention, the main outlet air duct 45 from the fan 17 is tapped at 46 and a duct 47 extends from the tap point 46 to an outlet 48 at or adjacent the return point of the elevator 15. Preferably the duct 47 is defined by a pair of arcuate plates 49 and 50 which extend the full width of the fan outlet duct 46 and which open out into the cane and trash passage 44. As shown, the arcuate plate 50 eliminates the normal sharp corner at the edge of the passage 44 adjacent the elevator return point and provides a smooth transition for material passing from the primary elevator 15 into the passage 44. Furthermore, the edge of the plate 50 is preferably bent downwardly at 51 as illustrated to direct the air in a downwards direction along the adjacent wall 52 of the passage 44 to assist the flow of cane and trash and other light materials through the passage 44.

Preferably, the air intake to the duct 47 is assisted by a guide member 53 which constitutes portion of the wall of the fan duct and which is bent down as illustrated so as to ensure efficient flow of air into the arcuate duct 47.

To further reduce the possibility of blockages and to assist conveyance of the cane billets and trash through the passage, a further air directing assembly 54 is provided at the curved guide wall 56 on the opposite side of the billet and trash passage 44. Three transversely extending elongated slots 57 are formed in the guide wall 56 and the lower edge of each slot 57 is bent upwardly as illustrated. A hollow manifold 58 is fixed on the inside of the curved guide wall 56 and attached say by welding to the upwardly bent portions of each slot 57 and fully sealed to the inner surface of the curved guide wall so that any air fed into the manifold 58 passes downwardly through the slots 57 along the curved wall 56 to keep the wall 56 clear of build-up of trash or material. Furthermore, this air stream together with the air stream provided by the duct 47 will assist in forcing any light materials into the blower air stream.

Preferably, the manifold 58 tapers rearwardly as shown in FIG. 8 and air is supplied to the manifold 58 via a pair of flexible pipes which tap into the main fan outlet duct 45. Preferably each tap point comprises a pair of funnel-shaped members 60 disposed on either side of the fan outlet duct 45 rearwardly of the tap point 46 for the duct 47. Preferably, the respective flexible plastic pipes 59 are connected at one end to the funnels 60 and extend along the outside walls of the harvester and then in through the walls to be connected to the manifold 58. Preferably, also, the pipes 59 are clamped to the outside walls of the harvester to prevent wear thereto by rubbing or fouling against any moving parts of the harvester.

Figure 9:
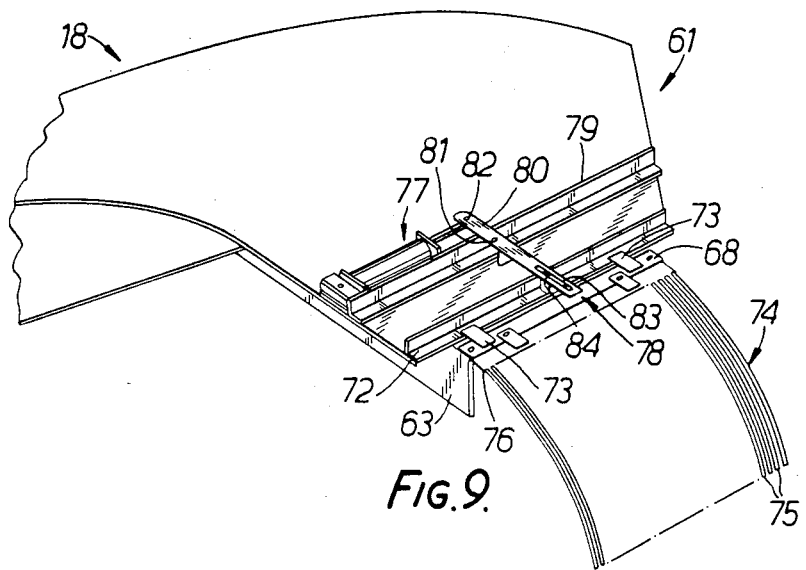
FIG. 9 is a perspective view of the trash outlet directing assembly according to the present invention.
Figure 10:
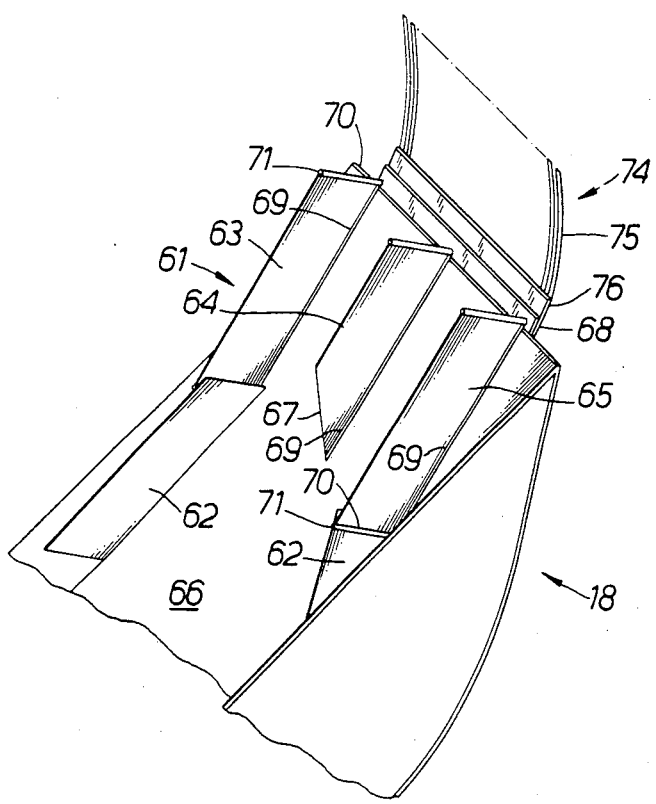
FIG. 10 is an underside perspective view of the trash outlet directing assembly illustrated in FIG. 9.

Referring now to FIGS. 9 and 10, there is illustrated a trash directing arrangement 61 located at the outer end of the outlet chute 18 of the harvester. The trash directing arrangement 61 preferably includes a first pair of fixed vanes 62 and three pivotal vanes 63, 64 and 65 disposed within the chute 18. The vanes 62 are fixed to the inner wall 66 of the chute and converge inwardly as shown. The two outer pivotal vanes 63 and 65 are pivotally mounted to the wall 66 of the chute adjacent the ends of the fixed vanes 62 but so that the fixed vanes slightly overlap as shown and extend outwardly to the end of the chute 18. The central vane is also pivotally mounted to the wall 66 and preferably is tapered at 67 towards its pivotal mounting to prevent build up of trash therearound. The outer ends of the vanes 63, 64 and 65 are pivotally connected to a transversely extending member 68 whereby the transverse movement of the member 68 will cause corresponding pivotal movement of the vanes. Preferably the vanes are strengthened along their edges by pipe members 69 welded thereto whilst the pivotal connections also comprise pipe members 70 and respective bolts 71 which extend through the pipe members to be connected to either the chute wall 66 or the transverse member 68. The transverse member 68 is adapted to be slidably engaged with a transversely extending guide member 72 fixed to the outer end of the chute. Preferably, the transversely extending guide member 72 comprises an angle iron member and slidable along the surface of the guide member 72.

A curved comb assembly 74 including a plurality of arcuate fingers 75 is fixed to a further transverse member 76 which is also linked for movement with the member 68 so that the comb assembly 74 is movable transversely with the vanes. Preferably, transverse movement of the vanes and comb assembly is controlled by a hydraulic ram 77 and linkage assembly 78. Preferably, the hydraulic ram 77 is mounted adjacent an angle member 79 extending transversely of the chute 18 and the linkage assembly 78 includes a link 80 which is pivotally connected intermediate its ends at 81 to a bracket fixed to the member 79.

The link 80 is pivotally connected at one end 82 to the piston rod of the ram 77 and at its other end is provided with an elongated slot 83 for engagement with a pin or bolt 84 fixed to the transverse members 68 and 76. It will thus be seen that extension and retraction of the ram 77 will cause pivotal movement of the link 80 and transverse reciprocatory motion of the vanes 63, 64 and 65 and the comb assembly 74. Thus trash can be directed from the outlet chute 18 where required and directed downwardly by the comb assembly 74 to the ground and close to the rear of the harvester so as to reduce the possibility of trash being blown into the adjoining fields or the like. The above arrangement also enables an even spread of trash to be directed to the ground so as not to preclude growth of cane shoots therethrough and to reduce weed growth as in trash blanket farming.

It will be realised that the above improvements singly or in combination will improve the overall performance of the harvester. Furthermore, it will be realised that any of the above improvements may be applied to any harvester. The rake assembly described with reference to FIGS. 4, 5 and 6 may be applied to any harvesting machine whilst the air assisted conveyance system described with reference to FIGS. 7 and 8 has many applications in the conveyance of materials other than cane billets and trash.

It will also be realised that many variations may be made to the above improvements; for example, the rake assembly disclosed in FIGS. 4, 5 and 6 may be of many different forms and include any number of prongs or tynes and vanes as desired. It will also be realised that in the air conveyance system illustrated in FIGS. 7 and 8 any number of slots 57 or alternatively one single slot may be provided to extend across the guide wall 56. Furthermore, any number of vanes may be used with the trash deflecting system described with reference to FIGS. 9 and 10.

It will thus be understood that whilst the above has been given by way of illustrative example, various modifications and variations may be made to the above described embodiments by persons skilled in the art without departing from the broad scope and ambit of the invention as herein defined in the appended claims.

I claim:

1. A cane harvester of the type including a cutter mechanism for cutting harvested cane stalks into billets, an endless conveyor assembly arranged to receive said billets and associated trash and leaves from said cutter mechanism, said conveyor assembly extending upwardly and rearwardly from said cutter mechanism, a passageway extending downwardly from the upper end of said conveyor assembly through which said billets, trash and leaves pass from said upper end of said conveyor assembly, and forced air producing means for directing a first flow of forced air across said passageway for separating said trash and leaves from said billets and wherein the improvement comprises means for producing a secondary flow of forced air, an air outlet into said passageway adjacent said upper end of said conveyor assembly and communicating with said secondary air flow producing means, said outlet being directed downwardly whereby to direct said secondary flow of air generally along said passageway to reduce build up of trash and leaves adjacent said upper end of said conveyor assembly and assist in the passage of said billets trash and leaves along said passageway and into said first flow of air.

2. A cane harvester according to claim 1 wherein said means for producing said first flow of air includes a main duct communicating with said passageway and wherein said secondary air flow producing means includes a secondary duct communicating at its respective opposite ends with said main duct and said outlet.

3. A cane harvester according to claim 2 wherein said secondary duct is defined by a pair of substantially parallel wall members extending generally arcuately between said main duct and said outlet.

4. A cane harvester according to claim 3 wherein the said wall member adjacent said upper end of said conveyor assembly projects into said passageway and is turned downwardly.

5. A cane harvester according to claim 3 wherein said wall members extend substantially the full width of said main duct and intersect said main duct to define an inlet opening for said secondary duct.

6. A cane harvester according to claim 5 and including a guide member in said main duct downstream of, but adjacent said inlet opening, to direct air from said first air flow producing means into said secondary duct.

7. A cane harvester according to claim 2 and including further air outlet means in the side of said passageway opposite the first said outlet, a manifold assembly associated with said further outlet means and communicating with said main duct for directing forced air therefrom through said further air outlet means for assisting in the movement of said billets trash and leaves through said passageway.

* * * * *